(12) United States Patent
Pacella et al.

(10) Patent No.: US 10,505,844 B2
(45) Date of Patent: *Dec. 10, 2019

(54) NETWORK ELEMENT FEDERATION CONTROLLER AND FORWARDING BOX

(71) Applicant: Verizon Patent and Licensing Inc., Arlington, VA (US)

(72) Inventors: Dante J. Pacella, Charles Town, WV (US); Mani Tadayon, Leesburg, VA (US); Syed A. Ahmad, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 247 days.

This patent is subject to a terminal disclaimer.

(21) Appl. No.: 15/710,165

(22) Filed: Sep. 20, 2017

(65) Prior Publication Data

US 2018/0013672 A1 Jan. 11, 2018

Related U.S. Application Data

(63) Continuation of application No. 14/674,969, filed on Mar. 31, 2015, now Pat. No. 9,813,334.

(51) Int. Cl.
*H04L 12/721* (2013.01)
*H04L 12/935* (2013.01)
*H04L 12/24* (2006.01)

(52) U.S. Cl.
CPC .......... *H04L 45/66* (2013.01); *H04L 41/5054* (2013.01); *H04L 49/3054* (2013.01); *H04L 41/5012* (2013.01)

(58) Field of Classification Search
None
See application file for complete search history.

(56) References Cited

U.S. PATENT DOCUMENTS

| 2007/0002139 A1* | 1/2007 | Benson | G05B 13/0275 |
| | | | 348/143 |
| 2014/0112192 A1* | 4/2014 | Chou | H04L 41/042 |
| | | | 370/254 |
| 2016/0164853 A1* | 6/2016 | Bifulco | H04L 63/08 |
| | | | 726/7 |

* cited by examiner

*Primary Examiner* — Noel R Beharry
*Assistant Examiner* — Pamit Kaur

(57) ABSTRACT

A controller network device receives command input for providing services over a service provider network and receives a verification request to verify an initial output of a control communication sent to a forwarding network device by a second controller network device in a group of peer controller network devices. The controller network device receives, from other controller network devices in the group of peer controller network devices, results that are responsive to the verification request and based on the command input and identifies a majority output from the results. The controller network device compares the initial output from the second controller network device to the majority output to determine that the initial output failed a verification vote and determines when a threshold number of control communications from the second controller network device, including the initial output, have failed verification votes.

20 Claims, 10 Drawing Sheets

US 10,505,844 B2

NETWORK ELEMENT FEDERATION CONTROLLER AND FORWARDING BOX

CROSS-REFERENCE TO RELATED APPLICATIONS

The application is a continuation of U.S. patent application Ser. No. 14/674,969, filed on Mar. 31, 2015, the contents of which are hereby incorporated herein by reference in its entirety.

BACKGROUND

In software-defined networking (SDN), network administrators can manage network services through abstraction of lower-level functionality. Control plane devices communicate with forwarding plane devices to direct flows and services.

DETAILED DESCRIPTION OF PREFERRED EMBODIMENTS

The following detailed description refers to the accompanying drawings. The same reference numbers in different drawings may identify the same or similar elements.

An object of software defined networking (SDN) is decoupling of the network control plane from the network forwarding plane. Communications between the control plane and the forwarding (or resources) plane occur over what may be called a "southbound" interface. In a network federation, where vendors of multiple network devices may agree on standards, there may be standards defining, for example, communications among devices and/or minimum system requirements. The network federation may provide different services, such as wireless services, broadband services, private internet protocol (IP) services, layer 2 services, optical layer services, etc. In some implementations of the network federation, controller devices in the control plane may be specifically configured to manage particular types of services that are implemented by a particular subset of forwarding boxes in the forwarding plane, while other controller devices in the control plane may be configured to manage different particular types of services that are implemented by a different subset of forwarding boxes in the forwarding plane. In contrast with the controllers, the forwarding boxes may have nearly uniform features and capabilities. There may be a complete overlap, partial overlap, or no overlap of the subsets of forwarding boxes. Furthermore, controller devices for the particular services may be regionally divided, may have redundant functionality, and/or may support multiple different features.

Figure 1:
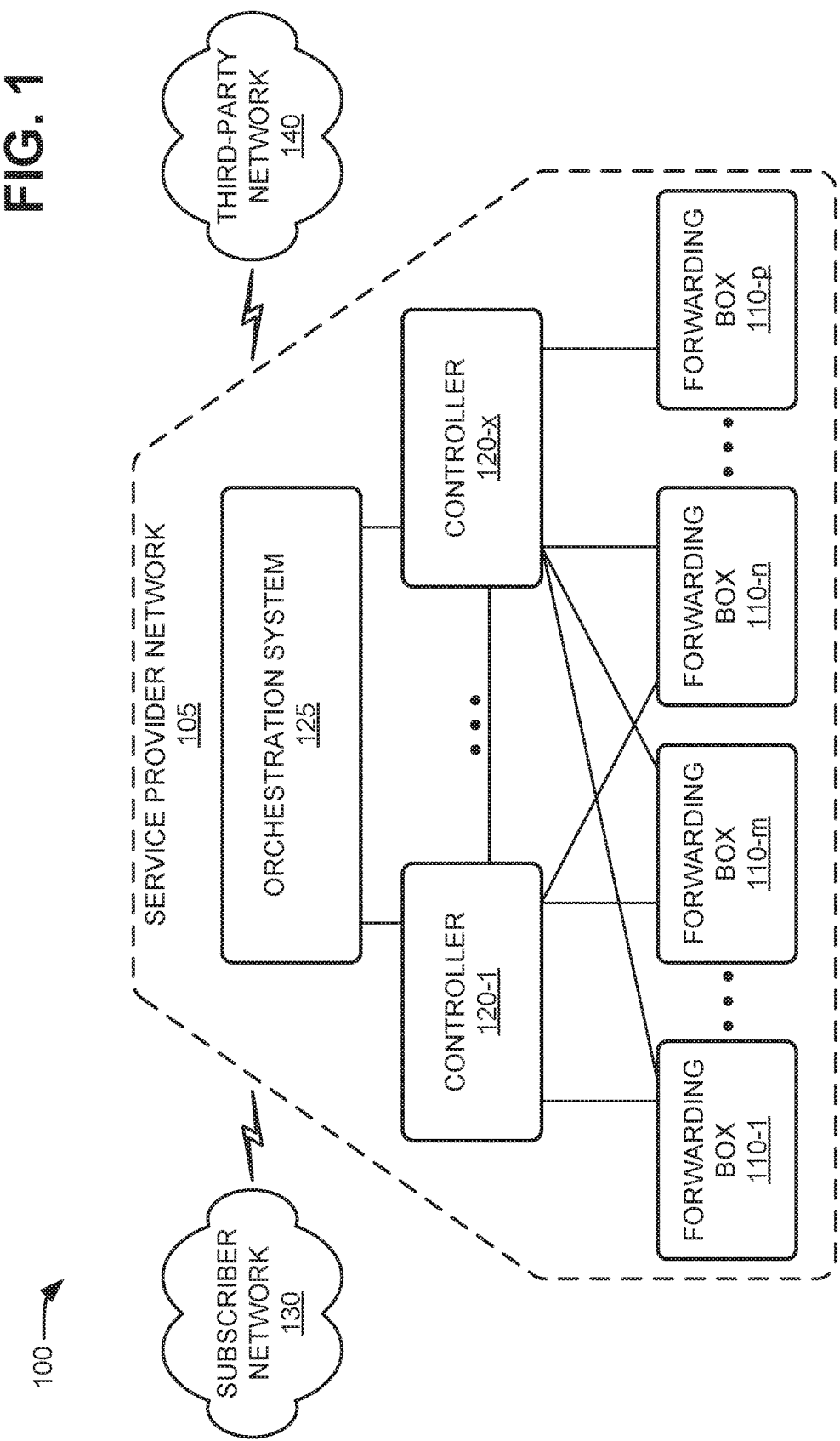
FIG. 1 is a diagram illustrating an exemplary network environment in which systems and/or methods described herein may be implemented.

FIG. 1 is a diagram illustrating an exemplary network environment 100 in which systems and/or methods described herein may be implemented. As illustrated, network environment 100 may include a service provider network 105 including multiple forwarding boxes 110-1 through 110-*p* (collectively "forwarding boxes 110" and individually "forwarding box 110"), multiple controllers 120-1 through 120-*x* (collectively "controllers 120" and individually "controller 120"), and one or more service orchestration systems 125; a subscriber network 130; and a third-party network 140. In practice, network environment 100 may include fewer, different, or additional elements than those illustrated in FIG. 1.

Service provider network 105 may include one or more wired, wireless and/or optical networks that are capable of receiving and transmitting data, voice and/or video signals, including multi-media signals that may include voice, data and video information (generally referred to herein as "services"). Service provider network 105 may include one or more wired and/or wireless networks via which a device in subscriber network 130 may communicate and/or receive content. For example, service provider network 105 may include a wide area network (WAN), a metropolitan area network (MAN), an ad hoc network, an intranet, a satellite based network, a fiber optic-based network, and/or a combination of these or other types of networks. Additionally or alternatively, service provider network 105 may include a cellular network, the Public Land Mobile Network (PLMN), and/or another mobile network. According to implementations described herein, service provider network 105 may employ Software Defined Networking (SDN) tools and conventions, including a separate service orchestration layer, control layer, and resources (or forwarding) layer.

Forwarding box 110 may include a data transfer device, such as a router, a gateway, a switch (e.g., an asynchronous transfer mode (ATM) switch), a firewall, a network interface card (NIC), a hub, a bridge, a proxy server, an optical add-drop multiplexer (OADM), a line access multiplexer (LAM), or some other type of device that processes and/or transfers data. In other implementations, forwarding box 110 may include a computing devices or network device. Each forwarding box 110 may be included within a forwarding layer of service provider network 105. In one example, one or more forwarding box 110 may be capable of establishing an end-to-end path between subscriber network 130 and third-party network 140. Forwarding box 110 may store performance metadata and physical configuration data that may affect the ability of forwarding box 110 to support services over service provider network 105. Multiple forwarding boxes 110 that are controlled by the same group of controllers 120 may be considered within the same subnetwork of service provider network 105. According to implementations described herein, each forwarding box 110 in the same subnetwork may initiate a verification process for control communications received from one of controllers 120.

Controller 120 may include computing devices or network devices that provide control plane functionality to direct data flows to/from subscriber network 130 (or user devices in subscriber network 130). Each controller 120 may be included within a control layer of service provider network 105. Controller 120 may include an application that manages flow control to enable intelligent networking. In one implementation, controller 120 may translate commands from an orchestration layer (e.g., orchestration system 125) into a format that can be used with forwarding boxes 110. For example, controller 120 may communicate with forwarding boxes 110 and other elements of service provider network 105 to manage data flows from one endpoint to another. Multiple controllers 120 that are specifically configured to manage particular types of services for the same subset of forwarding boxes may be considered "peers" within the same subnetwork. In one implementation, each controller 120 may request verification of control communications provided to forwarding boxes 110 from other controller 120 peers.

Orchestration system 125 may provide an interface from user devices to systems associated with service provider network 105 through orchestration layer application programming interfaces (APIs). Orchestration system 125 may support interactions between client devices and network devices associated with the service provider network 105. Orchestration system 125 may determine particular data formats to be used according to the services that a customer requests. Orchestration system 125 may also perform business functions such as controlling access to available services, providing catalogs of available services, managing customer orders, managing user profiles, and managing content licenses. Orchestration system 125 may also manage quality controls, track network resources, and manage workflows. In one implementation, orchestration system 125 may communicate data and/or commands (e.g., requirements for particular services) to controllers 120 via a "northbound" interface in an SDN environment.

Subscriber network 130 may represent a local area network (LAN or a home network) of a subscriber to services offered by the service provider of service provider network 105. In some implementation, subscriber network 130 may connect to service provider network 105 via a wired access network (not shown) or a direct connection. In other implementations, one or more devices in subscriber network 130 may also connect to service provider network 105 via a wireless access network. Devices in subscriber network 130 may include, for example, one or more routers (e.g., broadband routers) and/or user devices, such as a set-top box, a computer (e.g., a personal, tablet, or wearable computer), an internet television, a smart phone, a gaming system, or another device.

Third-party network 140 may include one or more server devices, or other types of computation or communication devices, that gather, process, search, and/or provide information in a manner described herein. In one implementation, third-party network 140 may include a computer system, an application, and/or a broadcasting device. Third-party network 140 may include, for example, IP content distribution facilities (e.g., IPTV). In one implementation, third-party network 140 may provide multimedia content that can be presented to a user on a user device in subscriber network 130.

In operation of service provider network 105, a controller 120 (e.g., controller 120-1) can elect to perform a sanity check or verification on a given control command or update (e.g., routing updates, FIB updates, etc.). Controller 120-1 can request a verification vote between functionally-equivalent controllers 120 (e.g., "peers"). The message to the other controllers 120 may include the input data and the output result. In one implementation, the output result may be mirrored by the egress port of controller 120-1 to prevent false negatives by using different egress lookup, framer, or checksum result.

Each of the other controllers 120 may analyze the request, compute a result, and populate the result to the other peer controllers 120. Each result received can be considered a vote. A common result among more than fifty percent (or potentially a configurable higher threshold) of votes from controllers 120 can be considered the "right" answer. In one implementation, a flag can be set on the update indicating that the entry has been verified and contains higher trust (e.g., higher than the trust level of an unverified entry).

The above peer verification model (or "eventual consistency" model) functions using the presumption that a quick (i.e., unverified) answer has already been populated as soon as possible. The "verified" answer can occur very quickly thereafter (e.g., milliseconds later). This peer verification model can also be used to measure network bifurcation events by monitoring select next-hops, routes, paths, a sum of forwarding boxes 110 in a community, a sum of controllers 120 in the community, a sum of entries, or a sum of sessions/entries learned from a protocol community. Some or all of such monitored network information can be processed through peer verification.

In a scenario which a forwarding box 110 can receive the same control communication from one or more controllers 120, for select transactions that forwarding box 110 could perform a sanity check according the method described above. For any real-time communication needing this verification process, the initial transaction can be accepted until verification is performed. If verification fails to confirm the initial transaction, the transaction will be reversed and/or terminated.

For verifications initiated by either forwarding box 110 or controller 120, a threshold can be set to monitor the number of results that do not match the quorum or majority result. The threshold can be set per forwarding box 110, per controller 120, or from a peer group of controllers 120. In other implementations, other information to be monitored could include network timing, average CPU load, network I/O, persistent processes or other health indicators. If any of these monitored factors are above the threshold for a given interval or for a rolling average, then a controller 120 (or forwarding box 110) can request a verification vote by its peers. The peers can determine that a particular controller 120 (or forwarding box 110) is far enough out of normal parameters or has given enough suboptimal answers that the particular controller 120 (or forwarding box 110) should be quarantined. If a quarantining quorum (or majority) is reached, then the particular controller's 120 (or forwarding box 110) clients are divided up by the remaining peers, subsequent updates from the particular controller 120 are ignored, and the client elements (e.g., forwarding boxes 110) of the particular controller 120 can receive notifications to prefer the new controller 120 elected for the client.

Quarantined systems can be isolated and examined by an operator. Additionally or alternatively, quarantined systems can be self-diagnosed, select processes components can be halted/rebooted, and/or cores can be copied to an analysis system for future forensics.

In one implementation, a penalty system can be introduced for suboptimal answers (e.g., results that do not match the quorum or majority response). The penalty systems can increase an unreliability quotient with, for example, a half-life decay. The unreliability quotient may be a numerical rating that represents how reliably a controller performs. The per-answer penalty and the half-life decay interval can be tunable. Once a penalty threshold for the unreliability quotient is crossed, a quorum can be called by the rest of the peer controllers 120, even if the penalized controller 120 does not respond.

Once the quarantined controller 120 has been recovered and basic health checks are passed, the quarantined controller 120 can request inclusion into the topology and the peers vote, asking for "sanity" (e.g., verification) updates on monitored network factors, as described above. After a passing vote, clients (e.g., forwarding boxes 110) can be added back to the previously quarantined controller 120. If the vote does not pass, a backoff timer may be invoked and the reinstatement process can be repeated after the backoff timer expires.

In FIG. 1, the particular arrangement and number of components of network environment 100 are illustrated for simplicity. In practice there may be more service provider networks 105, forwarding boxes 110, controllers 120, subscriber networks 130, and/or third-party networks 140. Components of network environment 100 may be connected via wired and/or wireless links.

Figure 2:
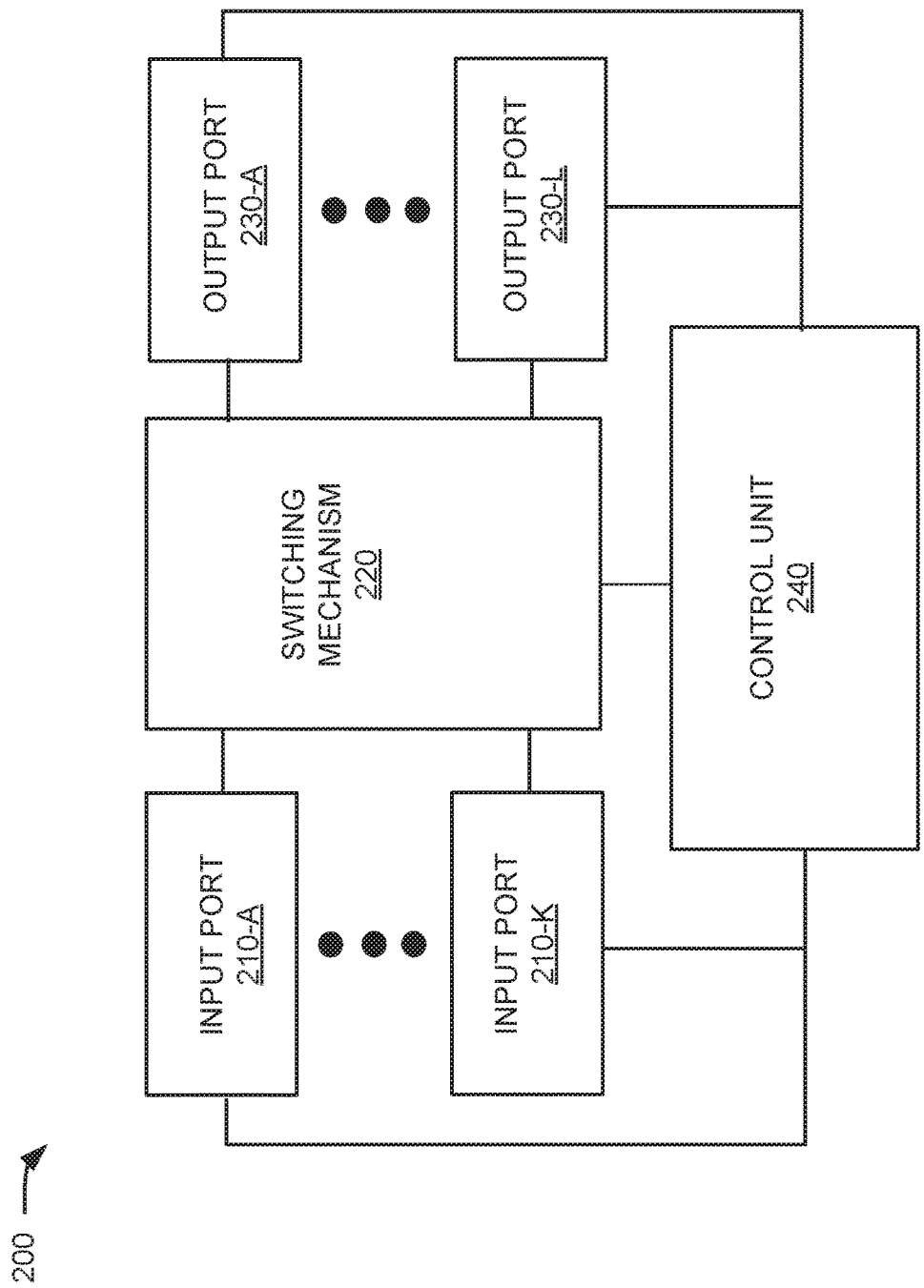
FIG. 2 is a diagram illustrating exemplary components of a routing device that may correspond to one or more of the devices of FIG. 1.

FIG. 2 is a diagram illustrating exemplary components of routing device 200. In some implementations, forwarding box 110 may be included within routing device 200. As shown in FIG. 2, routing device 200 may include one or more input ports 210-A to 210-K (referred to herein individually as "input port 210" and collectively as "input ports 210"), a switching mechanism 220, one or more output ports 230-A to 230-L (referred to herein individually as "output port 230" and collectively as "output ports 230"), and a control unit 240.

Input ports 210 may be the points of attachment for physical links and may be the points of entry for incoming traffic. An input port 210 may be associated with an interface card. Input port 210 may perform some or all of data plane processing associated with an incoming packet. Data plane processing may encompass looking up a destination address for an incoming packet, removing (or changing) a label associated with the packet, determining a path through switching mechanism 220, and/or filtering the packet based on one or more filters.

Switching mechanism 220 may include one or more switches and/or switch fabrics to facilitate communication between input ports 210 and output ports 230. In one implementation, each of the switch fabrics may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card. Output port 230 may perform some or all of data plane processing associated with an outgoing packet. For example, output port 230 may classify the packet based on a quality of service class, schedule the packet in a particular queue, add (or change) a label associated with the packet, and/or filter the packet based on one or more firewall filters.

Control unit 240 may interconnect with input ports 210, switching mechanism 220, and/or output ports 230 and may control operation of routing device 200. For example, control unit 240 may communicate with controller 120 to perform control plane operations associated with routing device 200 (e.g., control unit 240 may communicate features and performance metadata of device 200 to controller 120 for use in routing tables and/or forwarding tables that are used in traffic forwarding). As described further herein, control unit 240 may initiate verifications of commands from controllers within a peer group.

Although FIG. 2 shows exemplary components of routing device 200, in other implementations, routing device 200 may include fewer components, different components, differently arranged components, and/or additional components than depicted in FIG. 2. Additionally or alternatively, one or more components of routing device 200 may perform one or more tasks described as being performed by one or more other components of routing device 200.

Figure 3:
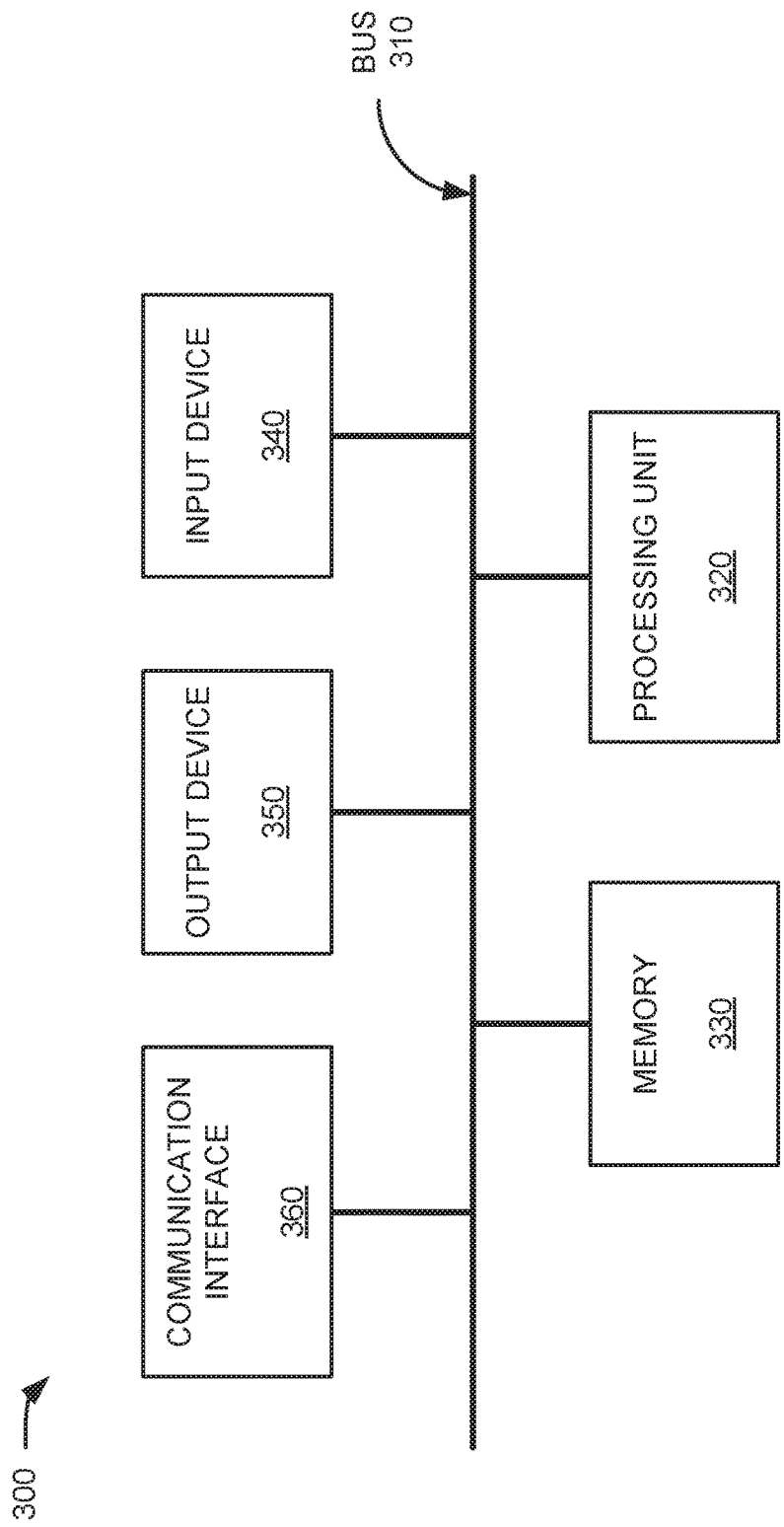
FIG. 3 is a diagram illustrating exemplary components of a computing device that may correspond to one or more of the devices of FIG. 1.

FIG. 3 is a diagram of exemplary components of a device 300. Each of controller 120 and other devices in service provider network 105, subscriber network 130, and third-party network 140 may be implemented as software, hardware, or a combination of hardware and software, on its respective device 300. In some implementations, forwarding box 110 may also be included within device 300. As shown in FIG. 3, device 300 may include a bus 310, a processing unit 320, a memory 330, an input device 340, an output device 350, and a communication interface 360. In one implementation, device 300 may be configured as a network device that communicates over a network via communication interface 360. In another implementation, device 300 may be configured as part of a set-top box or media server.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a remote control, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices in network environment 100. Each of such other devices of network environment 100 may include its respective communication interface 360 to achieve such communication.

As described herein, device 300 may perform certain operations in response to processing unit 320 executing software instructions contained in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than those depicted in FIG. 3. As an example, in some implementations, a display may not be included in device 300. Alternatively, or additionally, one or more components of device 300 may perform one or more other tasks described as being performed by one or more other components of device 300.

Figure 4:
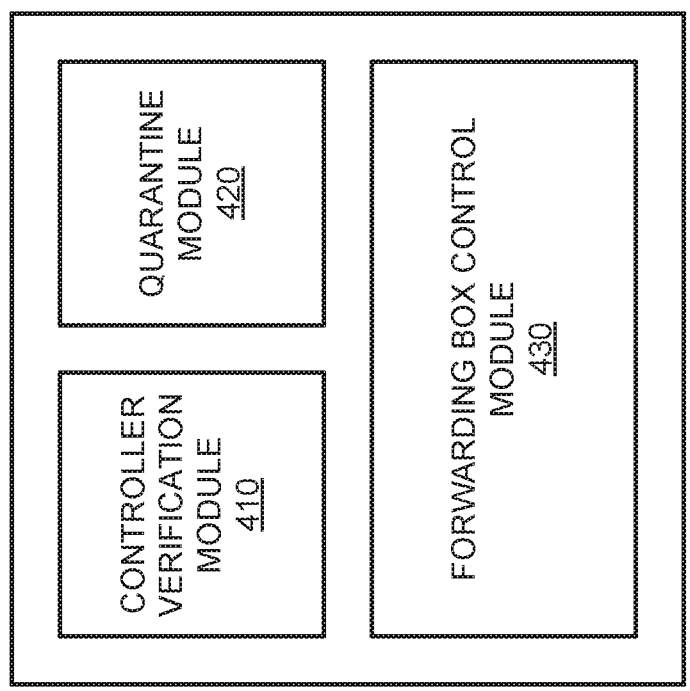
FIG. 4 is a block diagram of exemplary functional components of the controller of FIG. 1.

FIG. 4 is a block diagram of exemplary functional components of controller 120. The functions described in connections with FIG. 4 may be performed by one or more components of device 300 (FIG. 3) (e.g., processing unit 320 executing instructions stored in memory 330). As shown in FIG. 4, controller 120 may include a controller verification module 410, a quarantine module 420, and a forwarding box control module 430.

Controller verification module 410 may initiate and perform verification votes among peer controllers 120. Controller verification module 410 may identify which control communications that are provided to a forwarding box 110 should be verified. For example, controller verification module 410 may select communications at random, at select intervals, or based on communication type and/or an importance level of a communication. In one implementation, controller verification module 410 may provide, to peer controllers 120, a verification request to verify an initial control communication. The verification request may include the input from orchestration system 125 and the initial control communications that were output in response to the input. Controller verification module 410 may provide responses to verification request and/or receive responses to the verification request from peer controllers 120. Each of the responses may include a calculated output based on the command input. Controller verification module 410 apply a verification schema to determine a consensus (or majority) output from the peer responses, and may compare the initial output to the consensus/majority output to determine if the first control communication is verified. Controller verification module 410 may send a second (e.g., verified) control communication to implement the command input when the initial output matches the consensus/majority output. The second control communication, which may occur just milliseconds after the initial control communication may include a verified output indication.

Quarantine module 420 may implement quarantine procedures for controllers 120 within a subnetwork of service provider network 105. Quarantine module 420 may log results of verification votes performed by controller verification module 410. Quarantine module 420 may also determine, based on the logged results, when a threshold number of control communications from the controller network device have failed a verification vote. When the threshold is exceeded, quarantine module 420 may initiate a quarantine vote among peer controller network devices 120. In one implementation, quarantine module 420 may determine that a quarantine for a particular controller 120 is needed, negotiate with other (non-quarantined) controllers 120 to redistribute client forwarding boxes 110 of the quarantined controller, and provide new controller associations to the affected forwarding boxes 110.

Forwarding box control module 430 may receive commands from orchestration system 125 and apply network topology to meet routing requirements. Forwarding box control module 430 may receive command input for providing particular services over service provider network 105. In response, forwarding box control module 430 may provide, to forwarding boxes 110, an initial control communication that includes an output to implement the command input.

Although FIG. 4 shows exemplary functional components of controller 120, in other implementations, controller 120 may include fewer components, different components, or additional components than those depicted in FIG. 4. For example, in other implementations, controller 120 may include interfaces to communicate with other controllers 120 (e.g., within a federation) and/or receive policy updates from other systems.

Figure 5:
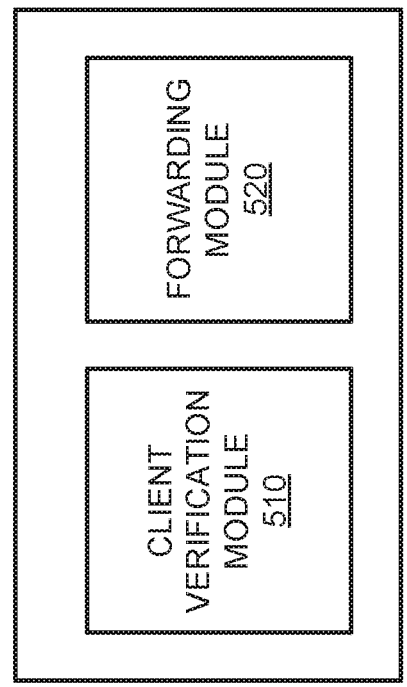
FIG. 5 is a block diagram of exemplary functional components of the forwarding box of FIG. 1.

FIG. 5 is a block diagram of exemplary functional components of forwarding box 110. The functions described in connections with FIG. 5 may be performed by one or more components of device 200 (FIG. 2). As shown in FIG. 5, forwarding box 110 may include a client verification module 510 and a forwarding module 520.

Client verification module 510 may manage verification of control commands from controllers 120. In one implementation, client verification module 510 may receive a command or update from controller 120 and elect to verify the command. For example, client verification module 510 may select communications to verify at random, at select intervals, or based on communication type and/or an importance level of the communication. Examples of communication types that may warrant verification may include changes to a high QoS flow, adding new forwarding boxes to a flow, etc. Upon receiving an unverified command from one controller 120, the initial command can be accepted until the verification is performed. Client verification module 510 may provide a verification request to another controller 120 within the same controller peer group and receive a response from the peer controller. If verification fails to confirm the initial command, it will be reversed.

Forwarding module 520 may perform forwarding plane functions that are directed by controller 120 to route traffic across service provider network 105. For example, forwarding module 520 may implement Quality of Service (QoS), traffic shaping, policing, queuing, encapsulation, failure detection, bidirectional forwarding detection (BFD), fast reroute (FRR), packet replication, and/or packet filtering. Forwarding module 520 may also perform other data collection and monitoring functions.

Although FIG. 5 shows exemplary functional components of forwarding box 110, in other implementations, forwarding box 110 may include fewer components, different components, or additional components than those depicted in FIG. 5.

Figure 6:
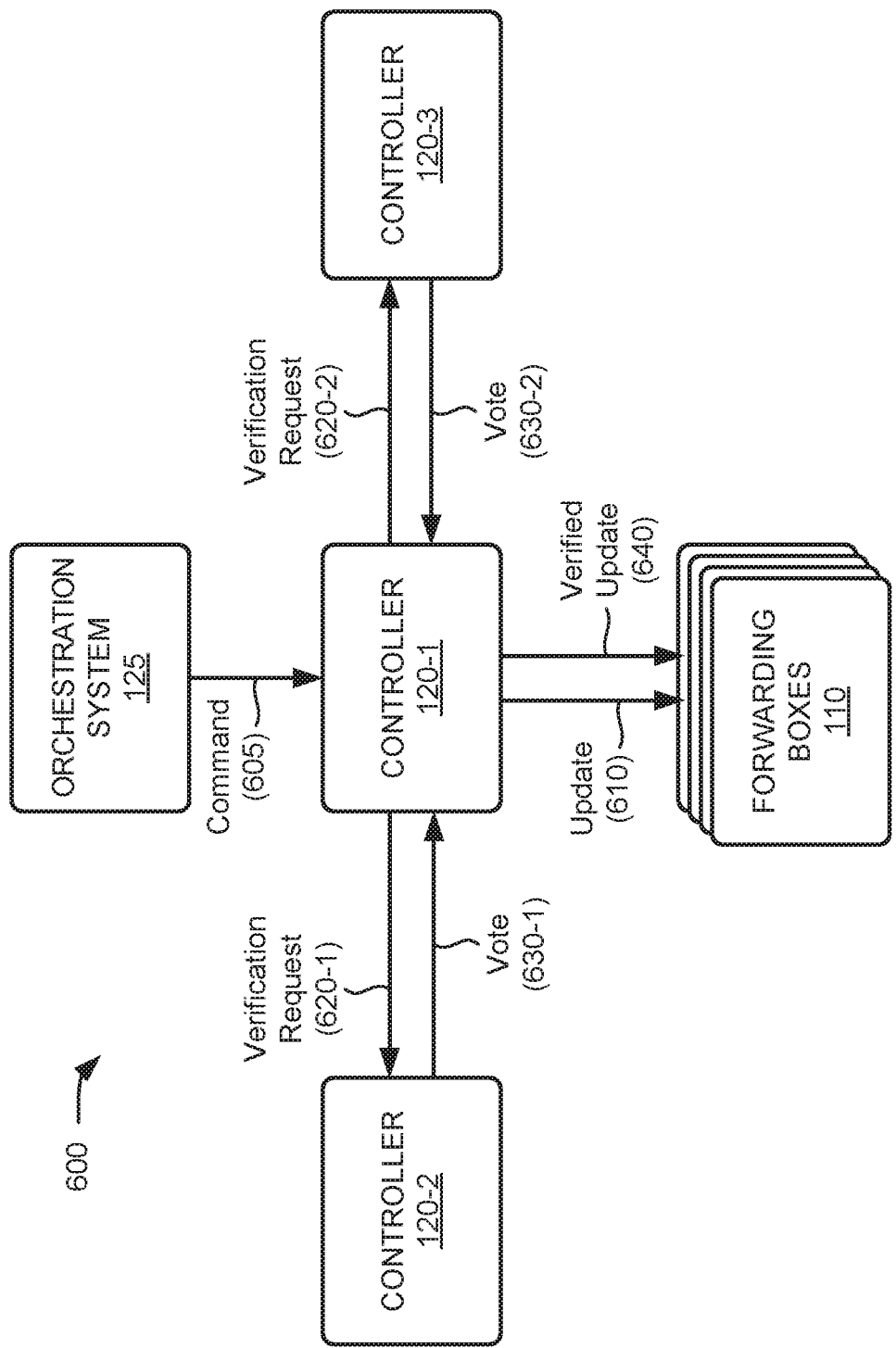
FIG. 6 is a diagram of exemplary communications among devices within a portion of the service provider network of FIG. 1.

FIG. 6 is a diagram of exemplary communications among devices within a portion 600 of service provider network 105. Communications in FIG. 6 may represent simplified communications for verifying control communications from a controller. As shown in FIG. 6, network portion 600 may include multiple forwarding boxes 110; controllers 120-1, 120-2, and 120-3; and orchestration system 125. Controllers 120-1, 120-2, and 120-3 are assumed to be within the same peer group. Forwarding boxes 110, controllers 120, and orchestration system 125 may include features described above in connection with, for example, FIGS. 1-5.

As shown in FIG. 6, orchestration system 125 may provide a command 605 to controller 120-1. The command may include, for example, requirements for providing particular services over service provider network 105. Although not shown in FIG. 6, command 605 may also be replicated to controllers 120-2 and 120-3. Controller 120-1 may receive command 605 and may translate command 605 into a formatted control communication that can be used with forwarding boxes 110. Controller 120-1 may provide the formatted control communication, as update 610, to relevant forwarding boxes 110 within the peer community of controller 120-1.

Assuming update 610 is a type of control communication (or random selection) designated for verification, controller 120-1 may provide verification requests 620-1 and 620-2 to controllers 120-2 and 120-3, respectively. Verification requests 620-1 and 620-2 may be sent, for example, concurrently with sending of update 610 or shortly thereafter. Generally, verification requests 620-1 and 620-2 may include the input data (e.g., from command 605) used by controller 120-1 and the output result (e.g., from update 610) provided by controller 120-1. In one implementation, an applicable egress port of controller 120-1 may mirror the output result from update 610.

Controllers 120-2 and 120-3 may receive verification requests 620-1 and 620-2 and may each analyze their respective verification requests 620-1 and 620-2 and may each compute a result. Computed results may include, for example, a path of nodes (e.g., forwarding boxes 110) for a particular service flow through service provider network 105. Each result, under ideal conditions, would be a duplicate of update 610. Each result computed by controllers 120-2 and 120-3 can be considered a vote. Thus, controller 120-2 may provide vote 630-1 and controller 120-3 may provide vote 630-2. Controllers 120-2 and 120-3 may populate their results to controller 120-1, as shown in FIG. 6, and to the other peer controllers 120 (e.g., controllers 120-2 or 120-3, communication not shown). In one implementation, controllers 120-1, 120-2, and/or 120-3 may also log/store verification request 620 and votes 630 (e.g., for use in quarantine monitoring).

Controller 120-1 may receive votes 630-1 and 630-2 and compare votes 630-1 and 630-2 against update 610. Controller 120-1 may apply a verification schema to determine if update 610 is valid. For example, the verification schema may require that a common result among more than fifty percent (or potentially a configurable higher threshold) of votes (e.g., either including or excluding the 'vote' of controller 120-1 represented by update 610) from all the responding controllers 120 can be considered the correct or validated answer. Assuming votes 630-1 and 630-2 satisfy the verification schema, controller 120-1 may provide a verified update 640 to the same group of forwarding boxes 110 that originally received update 610. In one implementation, a flag can be set on verified update 640 indicating that the entry has been verified and contains higher trust (e.g., higher than the trust level of update 610). In the implementation of FIG. 6, forwarding boxes 110 may initially receive and implement update 610 until verified update 640 is received, which may trail update 610 by a short interval (e.g., in milliseconds). In one implementation, if an initial control command is not verified, the initial command may be reversed. In another implementation, the initial control command may be replaced by the consensus/majority answer of the other peer controllers.

While the exemplary communications in FIG. 6 are shown for validating communications to an existing forwarding box 110, in other implementations similar communications may be used to test and admit new controller peers 120.

Figure 7:
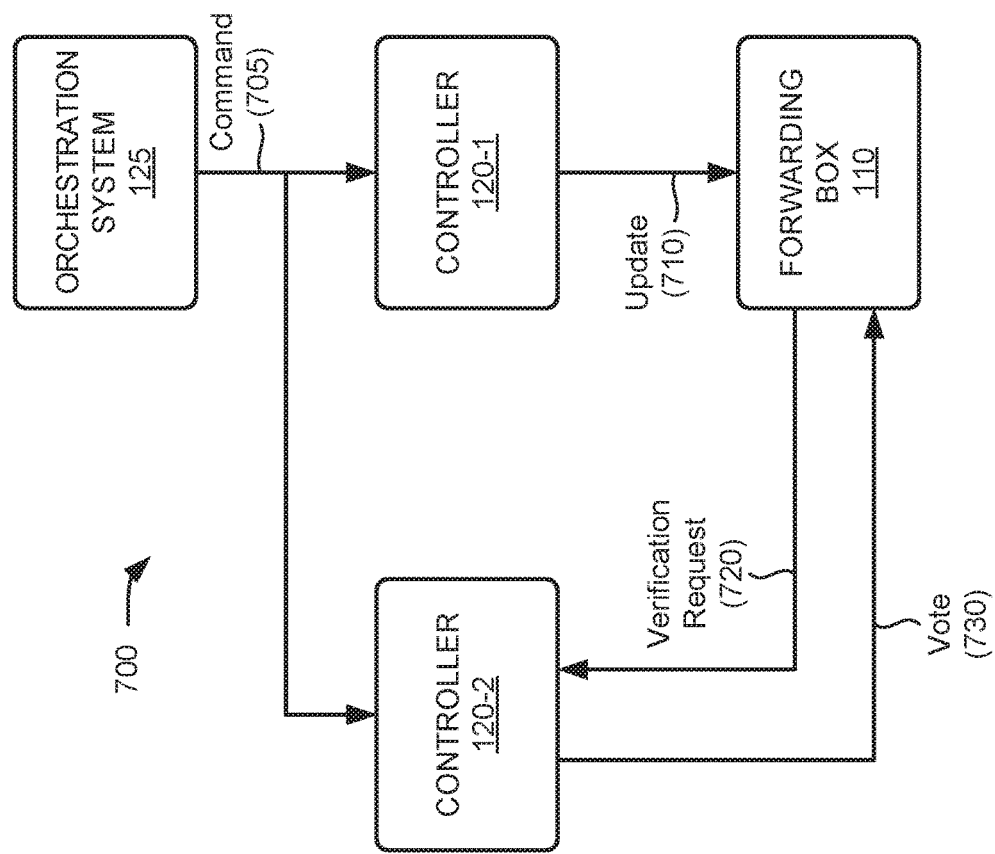
FIG. 7 is a diagram of exemplary communications among devices within another portion of the service provider network of FIG. 1.

FIG. 7 is a diagram of exemplary communications among devices within another portion 700 of service provider network 105. Communications in FIG. 7 may represent simplified communications for verifying control communications from a forwarding box. As shown in FIG. 7, network portion 700 may include forwarding box 110; controllers 120-1 and 120-2; and orchestration system 125. Controllers 120-1 and 120-2 are assumed to be within the same peer group. Forwarding box 110, controllers 120, and orchestration system 125 may include features described above in connection with, for example, FIGS. 1-6.

As shown in FIG. 7, orchestration system 125 may provide a command 705 to controller 120-1. The command may include, for example, requirements for providing particular services over service provider network 105. Command 605 may also be replicated to controller 120-2, which may act in a passive or backup capacity with respect to the functions of controller 120-1. Controller 120-1 may receive command 705 and may translate command 705 into a formatted control communication that can be used with forwarding box 110. Controller 120-1 may provide the formatted control communication, as update 710, to forwarding box 110 (and other forwarding boxes 110, not shown, within the same peer group of controller 120-1).

Forwarding box 110 may determine that update 710 is a type of communication designated (or randomly selected) for verification. Forwarding box 110 may provide a verification request 720 to controller 120. In another implementation, forwarding box 110 may provide verification request 720 to multiple controllers (e.g., within the same community of controller 120-1). Verification request 720 may be sent, for example, concurrently with forwarding box 110 processing of update 710 or shortly thereafter. Generally, verification request 720 may include the input communication (e.g., from update 710) provided by controller 120-1.

Controller 120-2 may receive verification request 720. Controller 120-2 may analyze verification request in conjunction with command 705 and compute a result, such as a flow path based on the input. The result, under ideal conditions, would be a duplicate of update 710. The result computed by controller 120-2 may be provided as vote 730 to forwarding box 110. In one implementation, controller 120-2 may also log/store vote 730 (e.g., for use in quarantine monitoring).

Assuming vote 730 matches update 710, forwarding box 110 may continue to implement update 710. In one implementation, forwarding box 110 may set a flag indicating the entry associated with update 710 has been verified. If forwarding box 110 seeks verification of update 710 from multiple controllers 120, forwarding box 110 may apply a verification schema (similar to that described above in FIG. 6) to determine if the vote verifies update 710. If vote 730

(or an assessment of votes from multiple controllers 120) fails to confirm update 710, forwarding box 110 can reverse and/or terminate update 710.

Figure 8:
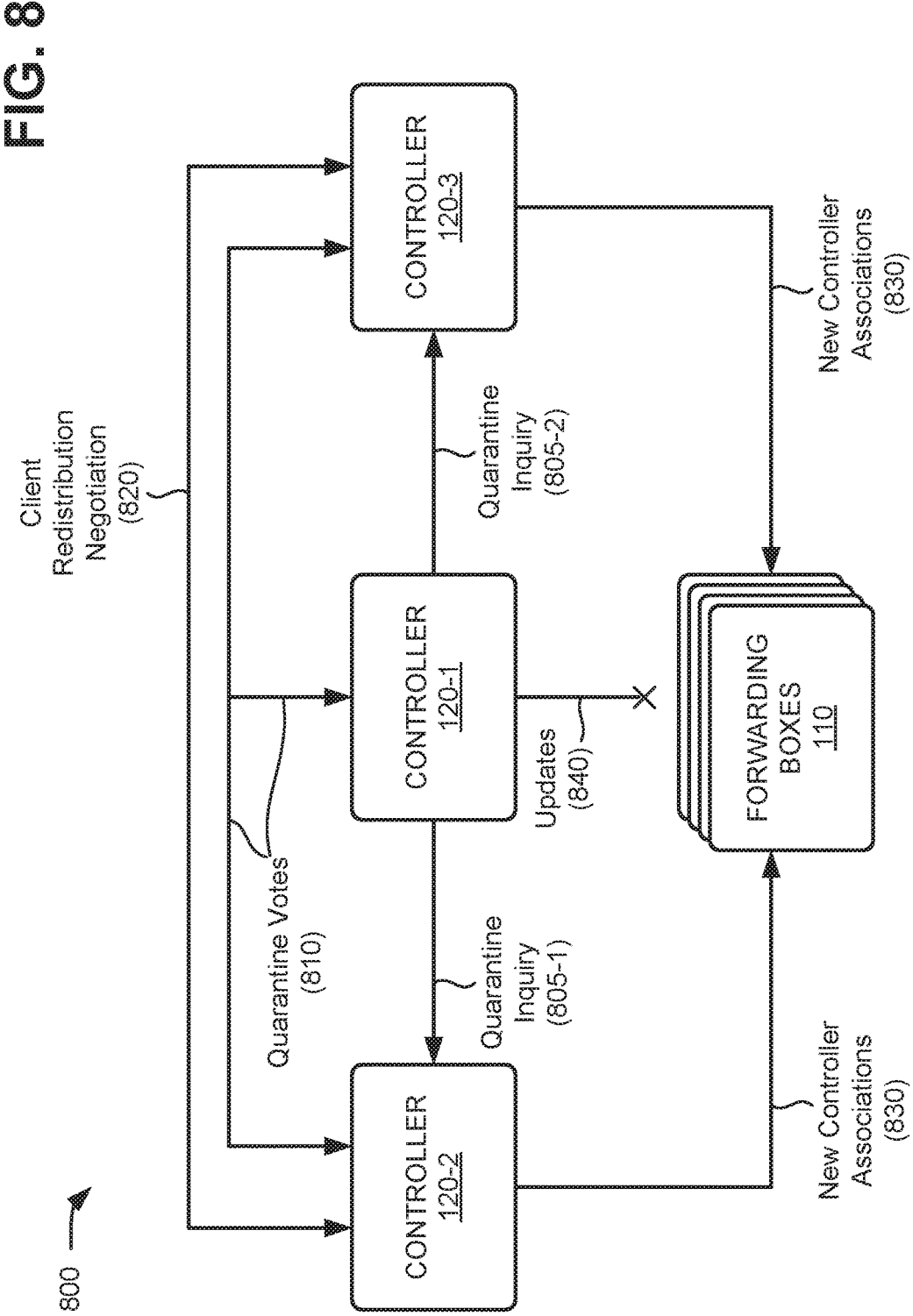
FIG. 8 is a diagram of exemplary communications among devices within still another portion of the service provider network of FIG. 1.

FIG. 8 is a diagram of exemplary communications among devices within another portion 800 of service provider network 105. Communications in FIG. 8 may represent simplified communications for quarantining a controller 120. As shown in FIG. 8, network portion 800 may include forwarding boxes 110 and controllers 120-1, 120-2, and 120-3. Controllers 120-1, 120-2, and 120-3 are assumed to be within the same peer group. Forwarding boxes 110, controllers 120, and orchestration system 125 may include features described above in connection with, for example, FIGS. 1-7.

Assume in FIG. 8, that controller 120-1 identifies that a threshold number of control communications to forwarding boxes 110 have failed a verification vote (e.g., multiple failed verification votes 630 within a particular time window). In response to detecting that the threshold has been exceeded, controller 120-1 may propagate quarantine inquiries 805-1 and 805-2 to controllers 120-2 and 120-3, respectively. Using, for example, stored data from previous verification requests 620 and votes 630 (FIG. 6), controllers 120-2 and 120-3 may analyze if controller 120-2 should be quarantined and propagate quarantine votes 810 to the other controllers 120 in the peer group. In one implementation, controllers 120-2 and 120-3 may apply the same or similar thresholds that controller 120-1 used to initiate quarantine inquiries 805.

Controller 120-1 may apply a quarantine schema to determine if quarantine inquiry 805 and votes 810 indicate that controller 120-1 should be quarantined. For example, the quarantine schema may require a quorum or threshold of more than fifty percent (or potentially a configurable higher percent) of positive quarantine votes (e.g., either including or excluding the 'vote' of controller 120-1 represented by quarantine inquiry 805) from all the responding controllers 120 to implement a quarantine process. Assuming quarantine votes 810 satisfy the quarantine schema, the remaining controllers (e.g., controllers 120-2 and 120-3) may conduct a negotiation 820 to redistribute clients (e.g., forwarding boxes 110) of controller 120-1 among the remaining controllers 120. Negotiation 820 may include, for example, sharing load balancing data and other information between the remaining controllers 120-2 and 120-3.

To implement the quarantine of controller 120-1, controllers 120-2 and 120-3 may provide new controller associations 830 to forwarding boxes 110 (e.g., based on the results of client redistribution negotiation 820). Upon receiving new controller associations 830, forwarding boxes 110 can be directed to prefer control signals from the new controller 120 (e.g., controller 120-2 or 120-3) elected for the client and to communicate with that new controller. As shown by the "x" in FIG. 8, subsequent updates 840 from the quarantined controller 120-1 are ignored by forwarding boxes 110. Instead, controllers 120-2 and 120-3 can provide future updates (not shown) to forwarding boxes 110.

Although FIGS. 6-8 shows exemplary communications within respective network portion 600, 700, and 800, in other implementations, these network portions may include fewer communications, different communications, and/or additional communications than those depicted in FIGS. 6-8. Alternatively, or additionally, one or more components of network portions 600, 700, or 800 may perform one or more other tasks described as being performed by one or more other components.

Figure 9A:
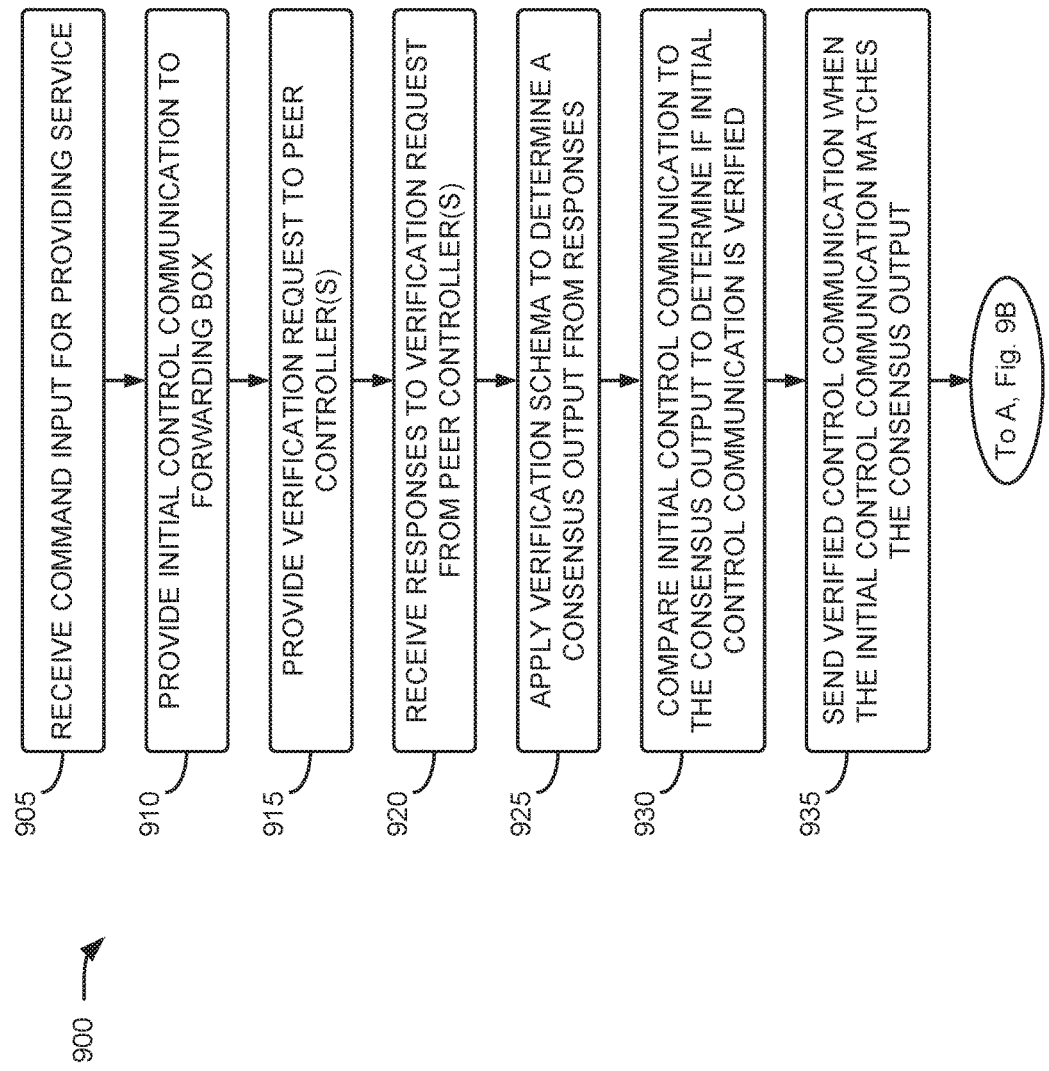
FIGS. 9A and 9B are a flow diagram of an exemplary process for providing a verified control communication to a forwarding box within a federation of controllers according to an implementation described herein.
Figure 9B:
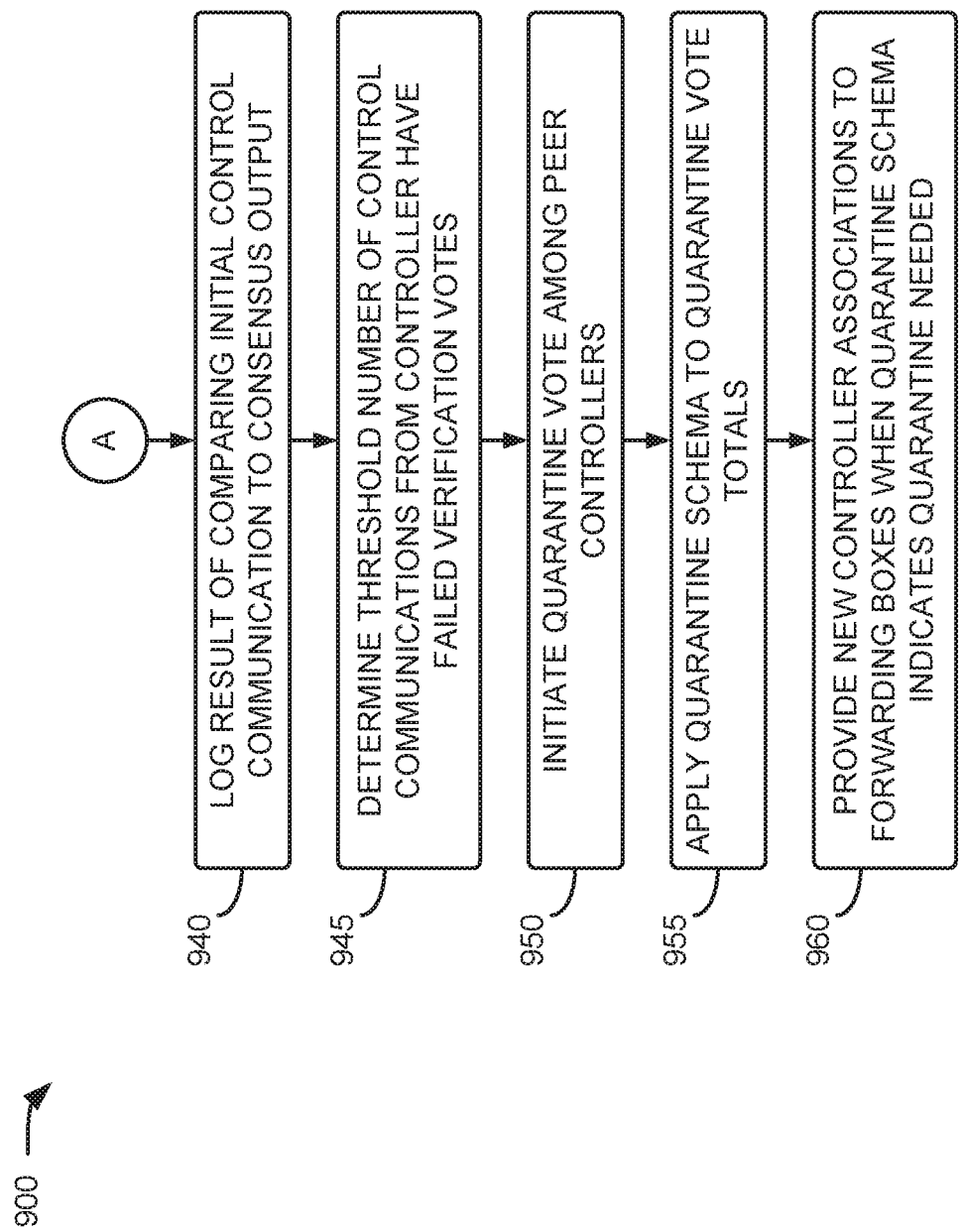

FIGS. 9A and 9B are a flow diagram of an exemplary process 900 for providing a verified control communication to a forwarding box within a federation of controllers. In one implementation, process 900 may be performed by controllers 120 within a subnetwork of service provider network 105. In another implementation, process 900 may be performed by one or more devices from service provider network 105 (including, for example, forwarding boxes 110 and controllers 120) in conjunction with other devices.

Process 900 may include receiving command input for providing a service (block 905) and providing an initial control communication to a forwarding box (block 910). For example, controller 120 may receive, from orchestration system 125, instructions to provide a particular service over service provider network 105. Controller 120-1 may apply the instructions to a network topology and provide an initial control communication (e.g., update 610 of FIG. 6) to one or more forwarding boxes 110. The initial control communication may include an initial output instruction to implement the command input from orchestration system 125.

Process 900 may also include providing verification requests to one or more peer controllers (block 915), and receiving responses to the verification request from the peer controllers (block 920). For example, controller 120-1 may provide, to other peer controllers (e.g., controller 120-2 and 120-3), a verification request (e.g., verification requests 620) to verify the initial control communication. The peer controllers may provide responses (e.g., votes 630) which may be received by controller 120-1.

Process 900 may further include applying a verification schema to determine a consensus or majority output from responses (block 925), comparing the initial control communication to the consensus or majority output to determine if initial control communication is verified (block 930), and sending a verified control communication when the initial control communication matches the consensus or majority output (block 935). For example, controller 120-1 may apply a verification schema to determine a consensus or majority output from the responses. Controller 120-1 may compare the initial control communication to the consensus output to determine if the initial control communication is verified. If verified, controller 120-1 may send another control communication (e.g., verified update 640), that includes a verified output indication, to implement the command input.

Process 900 may additionally include logging results of comparing initial control communications to consensus output (block 940) and determine when a threshold number of control communications from controller 120 have failed verification votes (block 945). For example, any one of controllers 120 may log each vote 630 and may determine, based on the logging, when a threshold number of control communications from the controller network device (e.g., controller 120-1) have failed a verification vote.

Process 900 may further include initiating a quarantine vote among peer controllers (block 950), applying a quarantine schema to vote totals (block 955), and providing new controller associations to forwarding boxes 110 when the quarantine schema indicates the need for a quarantine (block 960). For example, any one of controllers 120 in the same subnetwork may initiate a quarantine vote among the peer controllers 120, in response to the determining that the threshold number of control communications from a controller 120 has failed a verification vote. A controller 120 may receive quarantine votes (e.g., quarantine votes 810) and apply a quarantine schema to determine if the quarantine votes indicate that a controller 120 should be quarantined. Assuming the quarantine votes satisfy the quarantine schema, the remaining controllers (e.g., controllers 120-2 and 120-3) may conduct a negotiation 820 to redistribute clients (e.g., forwarding boxes 110) of controller 120-1 among the remaining peer controllers 120. The new controller associations may be provided to forwarding boxes with instructions to give the new controller assignments priority over the quarantined controller (e.g., controller 120-1).

According to systems and methods described herein, a controller network device, in a network control layer of a service provider network, may receive command input for providing services over a service provider network and may provide, to a forwarding network device, a first control communication. The first control communication may include an initial output to implement the command input. The controller network device may provide, to peer controller network devices, a verification request to verify the initial output of the first control communication; may receive, from the peer controller network devices, responses to the verification request that each include a calculated output based on the command input; and may apply a verification schema to determine a consensus or majority output from the responses. The controller network device may compare the initial output to the consensus or majority output and may send a second control communication, with a verified output indication, to implement the command input when the initial output matches the consensus or majority output.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, although network environment 100 includes a separate controller 120 and orchestration system 125, according to other embodiments, these devices may be combined or their functions distributed among different components within network environment 100. An another example, while series of blocks have been described with respect to FIGS. 9A and 9B, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a first controller network device in a group of peer controller network devices, command input for providing services over a service provider network;
   receiving, by the first controller network device, a verification request to verify an initial output of a control communication sent to a forwarding network device by a second controller network device in the group of peer controller network devices;
   receiving, by the first controller network device and from other controller network devices in the group of peer controller network devices, results that are responsive to the verification request and based on the command input;
   identifying, by the first controller network device, a majority output from the results;
   comparing, by the first controller network device, the initial output from the second controller network device to the majority output to determine that the initial output failed a verification vote; and
   determining, by the first controller network device, when a threshold number of control communications from the second controller network device, including the initial output, have failed verification votes.

2. The method of claim 1, wherein the first controller network device and the second controller network device are functionally equivalent within a subnetwork that includes the forwarding network device.

3. The method of claim 1, further comprising:
   logging, by the first controller network device, the comparing of the initial output to the majority output,
   wherein the determining when the threshold number of control communications from the second controller network device have failed verification votes is based on the logging.

4. The method of claim 1, wherein the first and second controller network devices are included within a network control layer of the service provider network.

5. The method of claim 1, further comprising:
   computing, by the first controller network device and in response to the verification request, a first result based on the command input,
   wherein the identifying includes identifying the majority output from the results and the first result.

6. The method of claim 1, further comprising:
   after determining the threshold number of control communications from the second controller network device have failed a verification vote, initiating a quarantine vote among the group of peer controller network devices.

7. The method of claim 6, further comprising:
   receiving, in response to initiating the quarantine vote, quarantine voting responses from the group of peer controller network devices.

8. The method of claim 7, further comprising:
   providing new controller network device associations to forwarding network devices that were previously controlled by the second controller network device when the quarantine voting responses indicate that the second controller network device should be quarantined.

9. The method of claim 1, wherein the second controller network device provides the verification request to verify the initial output of the control communication.

10. The method of claim 1, wherein the forwarding network device provides the verification request to verify the initial output of the control communication.

11. A controller network device, comprising:
a memory to store instructions; and
a processor to execute the instructions in the memory to:
- receive command input for providing services over a service provider network;
- receive a verification request to verify an initial output of a control communication sent to a forwarding network device by a second controller network device in a group of peer controller network devices;
- receive, from other controller network devices in the group of peer controller network devices, results that are responsive to the verification request and based on the command input;
- identify a majority output from the results;
- compare the initial output from the second controller network device to the majority output to determine that the initial output failed a verification vote; and
- determine when a threshold number of control communications from the second controller network device, including the initial output, have failed verification votes.

12. The controller network device of claim 11, wherein the processor is further to execute the instructions in the memory to:
- log the comparing of the initial output to the majority output, wherein determining when the threshold number of control communications from the second controller network device have failed verification votes is based on the logging.

13. The controller network device of claim 11, wherein the processor is further to execute the instructions in the memory to:
- compute, in response to receiving the verification request, a first result based on the command input, wherein the identifying includes identifying the majority output from the results and the first result.

14. The controller network device of claim 11, wherein the controller network device and the peer controller network devices are part of a federation of controller network devices using a software defined networking architecture.

15. The controller network device of claim 11, wherein the controller network device is functionally equivalent to the other controller network devices in the group of peer controller network devices within a subnetwork that includes the forwarding network device.

16. The controller network device of claim 11, wherein the processor is further to execute the instructions in the memory to:
- initiate a quarantine vote among the group of peer controller network devices, after determining a threshold number of control communications from the second controller network device have failed verification votes.

17. The controller network device of claim 16, wherein the processor is further to execute the instructions in the memory to:
- receive, in response to initiating the quarantine vote, voting responses from the group of peer controller network devices; and
- provide new controller network device associations to forwarding network devices that were previously controlled by the second controller network device when the voting responses indicate that controller network device should be quarantined.

18. The controller network device of claim 11, wherein the processor is further to execute the instructions in the memory to:
- receive another command input for providing services over a service provider network;
- provide, to another forwarding network device, another control communication, wherein in the other control communication includes output to implement the other command input; and
- provide, to the peer controller network devices, another verification request to verify the output of the other control communication.

19. A non-transitory computer-readable medium, storing instructions executable by one or more processors, the non-transitory computer-readable medium comprising one or more instructions to:
- receive command input for providing services over a service provider network;
- receive a verification request to verify an initial output of a control communication sent to a forwarding network device by a second controller network device in a group of peer controller network devices;
- receive, from other controller network devices in the group of peer controller network devices, results that are responsive to the verification request and based on the command input;
- identify a majority output from the results;
- compare the initial output from the second controller network device to the majority output to determine that the initial output failed a verification vote; and
- determine when a threshold number of control communications from the second controller network device, including the initial output, have failed verification votes.

20. The non-transitory computer-readable medium of claim 19, further comprising one or more instructions to:
- initiate a quarantine vote among the group of peer controller network devices, after determining a threshold number of control communications from the second controller network device have failed verification votes.

* * * * *